Feb. 5, 1924.

F. G. WHITE

POWER TRANSMISSION GEARING

Filed Sept. 22, 1921

Inventor
Fred G. White.
Attorney

Feb. 5, 1924.
F. G. WHITE
1,482,449
POWER TRANSMISSION GEARING
Filed Sept. 22, 1921
3 Sheets-Sheet 2
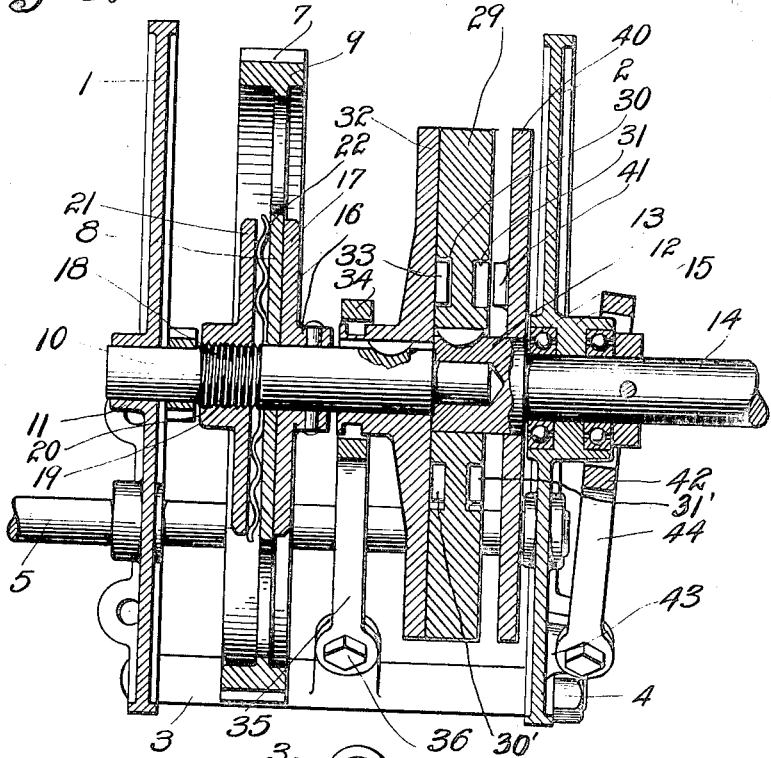
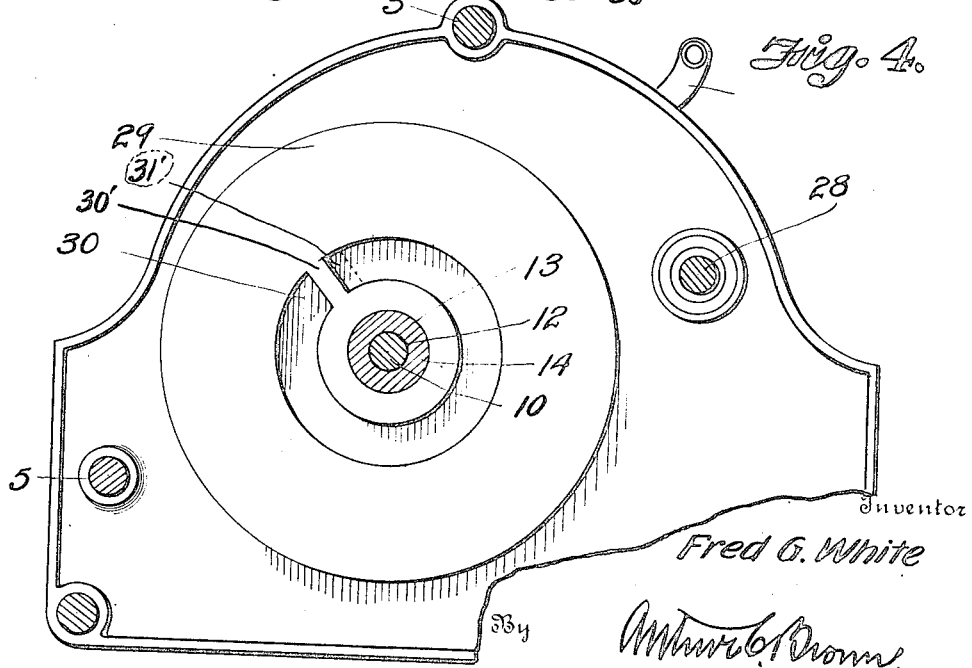
Inventor
Fred G. White
By Arthur C. Brown
Attorney

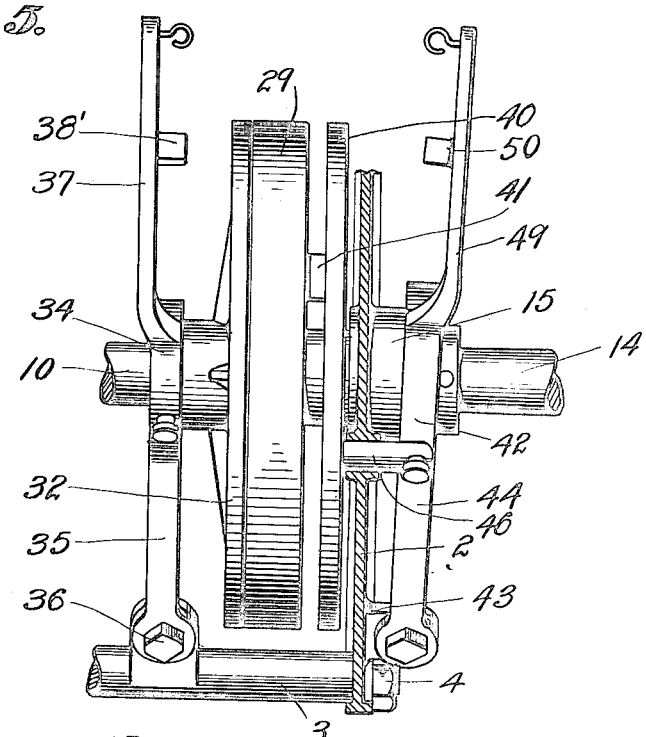
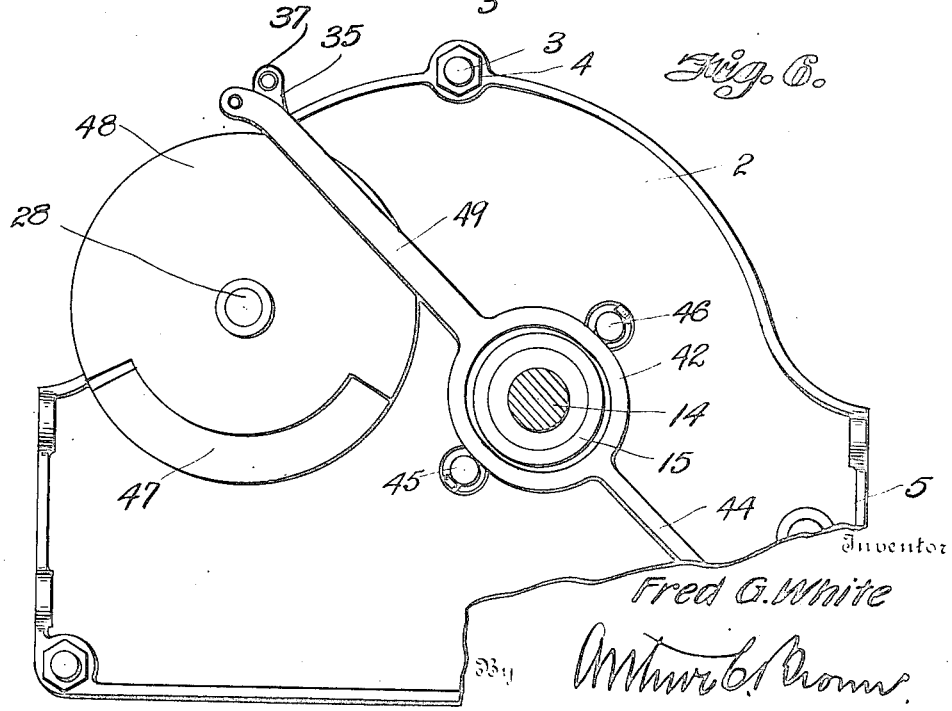

Patented Feb. 5, 1924.

1,482,449

UNITED STATES PATENT OFFICE.

FRED G. WHITE, OF KANSAS CITY, MISSOURI, ASSIGNOR TO LEWIS R. LONG, OF KANSAS CITY, MISSOURI.

POWER-TRANSMISSION GEARING.

Application filed September 22, 1921. Serial No. 502,519.

*To all whom it may concern:*

Be it known that I, FRED G. WHITE, a citizen of the United States, residing at Kansas City, in the county of Jackson and State of Missouri, have invented certain new and useful Improvements in Power-Transmission Gearing; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to power transmission gearing and particularly to a gearing to transmit power from a driving shaft to a driven shaft in such manner that the driving shaft can continuously operate but the driven shaft, through the gearing, be intermittently operated, there being a slip connection between one of the gears in the train and its shaft so that in the event that the mechanism between the driving shaft and the driven shaft becomes stuck or jammed, the driven shaft may continue to operate without rupturing any of the elements of the power transmission gearing.

A novel means is also provided for intermittently connecting the driving shaft in driving engagement with the driven shaft and for intermittently and alternately releasing the driven shaft from operative engagement with the driving shaft so that the element or elements controlled by the driven shaft may have determined periods of rest between their operative movements.

Other novel features of the invention as well as the specific details of construction will be referred to hereinafter, reference being had to the accompanying drawings, in which—

Fig. 3 is a sectional view on the line 3—3 of Fig. 2.

Fig. 4 is a sectional view on the line 4—4 of Fig. 1.

Fig. 5 is a view partly in elevation and partly in section of the members for intermittently effecting the operation and retardation of the driven shaft, and Fig. 6 is an end view of the same.

Figure 1:
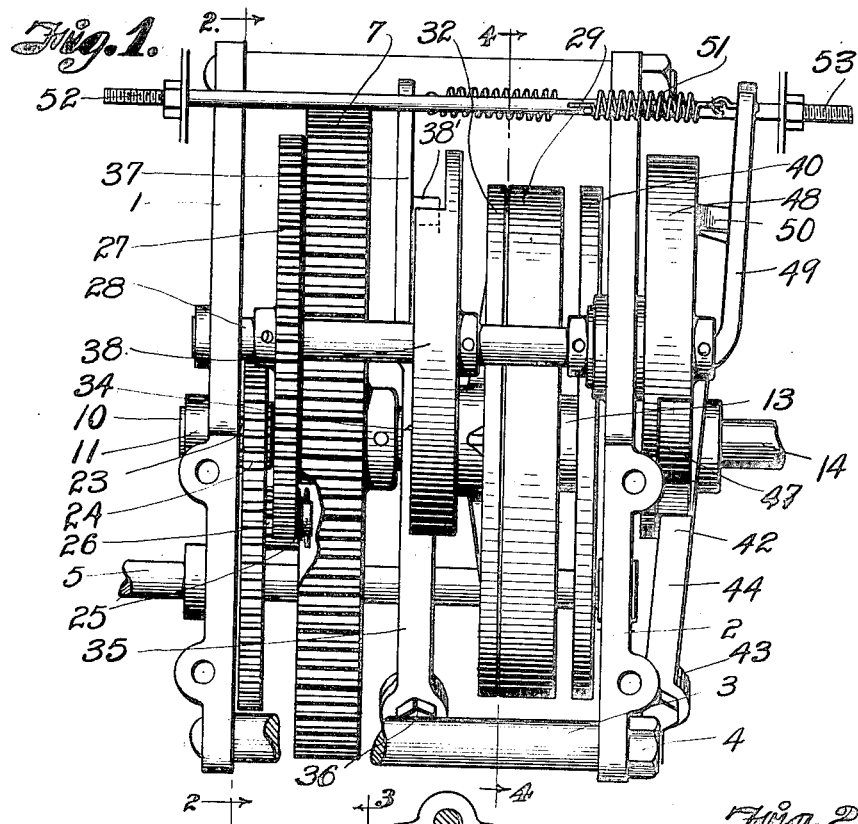
Fig. 1 is a side elevational view of a power transmission gearing constructed in accordance with my invention.
Figure 2:
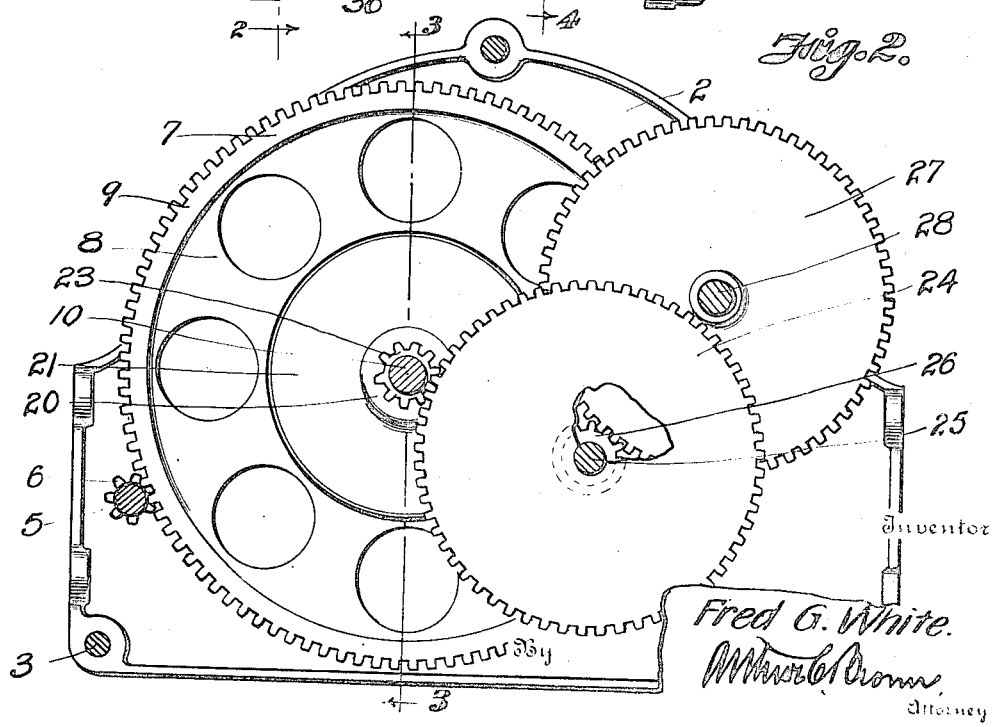
Fig. 2 is a sectional view on the line 2—2 of Fig. 1.

Referring now to the drawings by numerals of reference:

1 and 2 designate two end frames spaced appropriate distances apart and secured together by pillar bolts 3, riveted to the frame 1 and connected to the frame 2 by nuts 4.

The driving shaft 5 is mounted in bearings in the frames 1 and 2 and it carries a pinion 6, which meshes with and communicates motion to a gear 7, the diameter of the gear being relatively large with respect to the pinion so that a reduction gearing is provided.

The gear 7 is provided with a web 8 carried by the rim 9 of the gear and having a central opening through which projects a shaft 10, the web 8 being loose thereon and adapted to be frictionally held in engagement therewith by a novel form of slip clutch mechanism. The shaft 10 is journaled at one end in the bearing 11 in the frame 1 and at the other end in a bearing 12 in the enlarged portion or head 13 at the end of the driven shaft 14, which is journaled in a bearing 15, as clearly seen in Fig. 3.

Fixed to the shaft 10 is a friction collar 16, having a relatively wide bearing flange 17, against which the web 8 of the gear 7 may bear. On the opposite side of the web 17 and adjustably threaded to the shaft 10 through the medium of the exterior threads 18 on the shaft and the internal threads 19 is an adjustable collar 20, having a relatively wide flange 21 between which and the web 8 is a corrugated friction disk 22. By screwing up or adjusting the collar 20 the degree of friction between the friction disk 20, the flange 17 and the web of the wheel can be regulated, the connection being such that under normal conditions when the gear 7 is driven by the pinion 6, the shaft 10 will be driven, but in the event that the rotative movement of the shaft 10 is opposed to any great extent, or in the event that the mechanism driven from the shaft 10 becomes jammed, the gear 7 may rotate independently of the shaft 10, as will be clearly apparent by reference to Fig. 3.

Fixed on the shaft 10 is a pinoin 23, which meshes with a gear 24 mounted on the stub shaft 25 on the frame 1. The stub shaft 25 carries a pinion 26, which receives its motion from the gear 24, and the pinion 26 meshes with a gear 27 on a shaft 28, mounted in the frames 1 and 2, the shaft 28 carrying certain cam disks for shifting certain mechanism into and out of operative engagement with a driven disk 29, keyed to the hub or head 13 of the driven shaft 14, (see Fig. 3).

The disk 29 is provided on one face with a circumferential recess or groove 30, having a narrow web 30' across it to constitute a pick-up, and the opposite side of the disk is provided with a similar groove 31 having a narrow web 31' across it to constitute a stop. Keyed on the shaft 10 but adapted to slide thereon toward and away from the disk 29 is a driving disk 32, having a tooth 33 adapted to ride in the groove 30 and contact with the web 30' so as to pick-up the disk 29 for driving engagement.

The disk 32 is provided with a hub engaged by a yoke 34 on a rocking lever 35 (it being understood that the disk 32 is in effect a clutch for connecting the shaft 10 and the disk 29).

The rocking lever is pivoted at 36 in any suitable manner so that it will rock sidewise when the upstanding arm 37 of the yoke is moved through the medium of the cam disk 38 on shaft 28. The cam disk has a lobe of sufficient depth to ride upon the lug 38' of the arm 37 and move it away from the disk 29, causing the clutch disk or driving disk 32 to move out of driving engagement with the disk 29.

On the opposite side of the disk 29 is a locking disk 40, which has a stop or projection 41 adapted to be moved into and out of engagement with the circumferential recess or groove 31 through the medium of an actuator 42, illustrated as a yoke having pivotal connection with the ears or projections 43 on the frame 1 through the medium of the rocking lever 44. The yoke 42 carries pins or projections 45 and 46, which engage in the disk 40 to move it back and forth when the cam 47 on the cam disk 48 on the shaft 28 permits such movement.

By reference to Fig. 6 it will be observed that the yoke or ring 42 carries an upstanding lever 49 having a portion 50 to be engaged by the lobe 47 of the cam disk 48 so as to move the arm away from the disk 29 and carry with it the disk 40, but the disks 38 and 40 are normally urged toward the driven disk 29 by the tension springs 51, which is connected to said disks through the medium of the adjustable connections 52 and 53, shown as rods.

The lobes on the cams 38 and 48 are substantially diametrically opposite so that when the lobe on the cam 38 permits the finger or lug 33 to engage the web or pick-up in the groove 30, the lobe on the cam disk 48 will be moving the arm 49 away from the disk 29 so that its lug 41 will not be in the path of movement of the web or stop in the groove 31.

The lobes on the cams will be arranged, however, so that there will be a very slight interval between the time that the lug 33 releases from engagement with its shoulder or web and groove 30 and the time that the lug 50 is engaged by the stop or shoulder in the recess or groove 31. In other words, the pick-up will release before the stop comes into action and vice versa.

When the disk 29 is connected in operative engagement with the shaft 10 through the medium of the clutch disk 32, the shaft 14 will be driven at the same speed as the shaft 10 but when the disk 32 moves out of engagement with the disk 29 and the disk 41 moves into stop or retarding engagement with the shoulder in the groove 31 of the disk 29, the shaft 10 will be rotating while the shaft 14 is in a state of rest.

If, through any cause, the mechanism fails or becomes jammed so that the shaft 10 cannot rotate, the gear 7 may continue to rotate against the friction of the members 8, 17 and 22 so that no damage can occur to the motor or prime mover for actuating the driving shaft.

It will be observed that the parts are so constructed that they will automatically operate so that the driving shaft can continuously turn at a uniform rate of speed but that the driven shaft will intermittently operate and cease to operate in response to movement of the clutch cams and their complementary parts so that if the device is used for an intermittently operating sign, the proper intervals of time at which the sign panels are to remain in a state of rest to become visible to the reading public can be controlled in a convenient manner with assurance of proper functioning under normal conditions.

By reference to Fig. 3 it will be observed that the areas of the opposite faces of the disk 29 and the areas of the complementary faces of the disks 32 and 40 are such that when either disk 32 or 40 moves into operative engagement with the disk 29 under the influence of the spring, there will be a preliminary frictional driving engagement between the particular clutch disk and the disk 29 in co-operative engagement so that the disk 29 will be frictionally driven before the lugs come into contact with the webs in the grooves 30 or 31, as the case may be.

It is contemplated to adjust the tension of the springs so that the friction between the disk 32 and the face of the disk 29 will be sufficient to permit an initial pick-up of the disk 29 in such a manner as to avoid the lug 32 from contacting too violently against the web 30'. If the friction is sufficient, however, to cause driving contact between the disk 32 and the disk 29 without the lug 33 coming in contact with the web 30', the shaft 14 will be driven during its rotation until the actuator yoke 34 begins to relieve the friction, whereupon the disk 32 will complete its movement to align the contacting face of the lug 33 with the contacting face of the lug 30' so that the relative timing performance of the gears will not be destroyed.

The same effect occurs with respect to the disk 40 for since the disk 40 moves into frictional engagement with the disk 29 during the rotation of the disk 29, it will act as a brake to set up a retarding frictional engagement, permitting the web 31' to come in contact with the lug 41 during the retarded speed of the disk 29 so that there will be no pounding or jar against the lug, thereby eliminating liability of excessive vibration of the frames and mechanism carried thereby.

What I claim and desire to secure by Letters Patent is:

1. In a device of the class described, a shaft, a gear frictionally mounted on said shaft to normally drive it, another shaft aligning with the first named shaft, a disk thereon, a clutch member on the first named shaft movable into and out of engagement with the disk, a stop member movable into engagement with the disk when the clutch is out of engagement therewith and movable out of engagement with the disk when the clutch is in engagement therewith, and mechanically operating means controlled from the gear frictionally mounted on the first named shaft for effecting movement of the clutch and the stop member.

2. In a mechanism of the class described, a driving shaft, a driven shaft, a shaft intermediate the driving shaft and driven shaft, a gear frictionally mounted on the intermediate shaft, means for communicating motion from the driving shaft to the intermediate shaft through the gear, a disk fixed to the driven shaft, a longitudinally movable clutch member on the intermediate shaft movable into and out of engagement with the disk, a stop member movable into and out of engagement with the disk and alternating in its engagement therewith with the clutch member, shifters for the stop member and the clutch member, and cam devices controlled by the gear for alternately rendering the clutch member and the stop member effective and ineffective.

In testimony whereof I affix my signature.

FRED G. WHITE.